United States Patent [19]

Brolin

[11] 3,806,806

[45] Apr. 23, 1974

[54] ADAPTIVE DATA MODULATOR

[75] Inventor: Stephen Joseph Brolin, Livingston, N.J.

[73] Assignee: Bell Telephone Laboratories, Incorporated, Murray Hill, N.J.

[22] Filed: Nov. 20, 1972

[21] Appl. No.: 307,859

[52] U.S. Cl. .............................. 325/38 B, 332/11 D
[51] Int. Cl. .............................................. H04b 1/00
[58] Field of Search ............. 325/38 R, 38 B, 38 A; 332/11 D

[56] References Cited

UNITED STATES PATENTS

| | | | |
|---|---|---|---|
| 3,736,508 | 5/1973 | Sparrendahl | 325/38 B |
| 3,716,803 | 2/1973 | Candy | 325/38 B X |
| 3,689,840 | 9/1912 | Brown et al. | 325/38 B |
| 3,706,944 | 12/1972 | Tewksbury | 325/38 B X |

OTHER PUBLICATIONS

Handbook of Semiconductor Electronics, p. 11–72 (chapter).

*Primary Examiner*—Robert L. Richardson
*Assistant Examiner*—A. M. Psitos
*Attorney, Agent, or Firm*—J. K. Mullarney

[57] ABSTRACT

An adaptive delta modulator for analog signals, such as video signals, is characterized by its use of different criteria for the coding of the size and the polarity of each step signal derived from the transmitted pulses. The step signal is applied to an integrator which reconstructs an analog signal that is a replica of the analog input signal. In the encoding process, the step polarity is based upon the last transmitted signal (pulse or space). The size of that step, however, is based upon the pulse signal sequence of a predetermined number of signals transmitted immediately before the last transmitted signal. A finite memory (i.e., another integrator) is coupled in the encoder feedback path and it prevents a rapid decay of the step signal, and a slewing clip circuit is used at the input to the encoder to eliminate steep slopes, or rapid rises, in the applied analog signal.

1 Claim, 12 Drawing Figures

FIG. 2A
| ENCODING SEQUENCE | | TYPICAL VALUES $y_n = f(n)$ |
|---|---|---|
| $a_0 \neq a_1$ | $n = 1$ | $y_1 = 0$ |
| $a_0 = a_1 \neq a_2$ | $n = 2$ | $y_2 = 0.5$ |
| $a_0 = a_1 = a_2 \neq a_3$ | $n = 3$ | $y_3 = 1.5$ |
| $a_0 = a_1 = a_2 = a_3$ | $n = 4$ | $y_4 = 2.5$ |
FIG. 2B
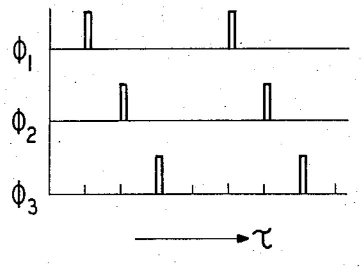
FIG. 5
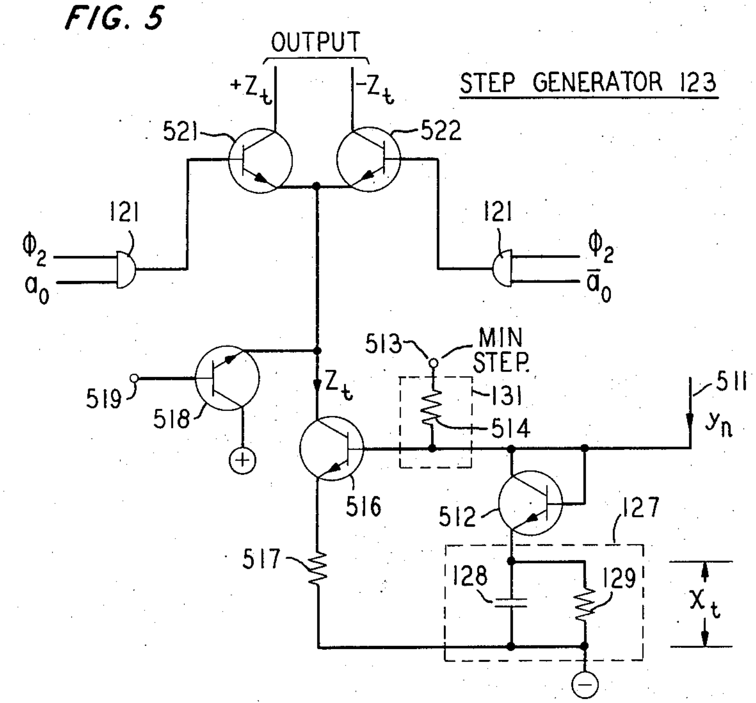

SLEWING CLIP 117

$H_1 \cdot H_2 = H$ DESIRED INTEGRATION

ADAPTIVE DATA MODULATOR

BACKGROUND OF THE INVENTION

This invention relates to digital message transmission systems and, more particularly, to variable step size, adaptive delta modulation encoding systems.

In the basic delta modulation system, an analog signal is periodically sampled and the sample is then compared with a feedback signal derived from an integrator circuit whose output amplitude is controlled by the transmitted pulse signal. The transmitted pulses comprise a train of positive and negative pulses, or pulses and spaces, occurring at a constant rate. These transmitted pulses are simply indicative of whether the periodic samples are greater or less than the feedback output of the integrator. In such a system, the step size is typically of a single value and therefore the circuitry can be comparatively simple. Unfortunately, this simple circuitry is not readily able to transmit accurately both large and small transitions in the analog signal.

Because of the above shortcoming, much effort has been made to achieve a form of delta modulation which adapts the step size automatically in response to the changing amplitude of the input analog signal. Between sampling intervals, the size and polarity of the step signal are usually determined concurrently before the feedback signal is generated. Now if the analog signal to be encoded contains high frequency components that produce steep transitions, such as video signals, the periodic sampling of the input signal is performed at a high rate to insure more accurate encoding. Under this condition, any propagation delay in the feedback circuitry, be it analog or digital, becomes a significant problem. This propagation delay must not be allowed to prevent the encoder from taking full account of the previous integration, if the delay is not going to degrade performance and cause erroneous sampling decisions. One previously proposed approach to this problem has been the exclusive use of high speed digital circuitry to provide the feedback signal, but any errors in transmission are cumulative when digital accumulation is used. It would, of course, be desirable to achieve the advantages of adaptive delta modulation without the foregoing limitations.

Another limitation of prior adaptive delta modulation systems is the occurrence of certain errors which result in an overall degradation of the signal transmission system. For example, one particular recurring error is the phenomenon known as "edge busyness," which is an acute problem in the encoding of television signals. This "edge busyness" is largely due to the random phasing of the coder timing signals with respect to the analog signal and the state of the encoder when a transition in the analog signal occurs. Thus, for example, in a video picture where the occurrence of changes from black to white produces steep transitions in the video signal, each successive scan can be phased dissimilarly with respect to the sampling of a delta modulator. The ability of the delta modulator to track this steep transition is dependent upon the state in which the encoding process of the delta modulator is in when transition occurs. These effects produce a definite movement or wavering of the sharp edge in the reproduced image.

SUMMARY OF THE INVENTION

The present invention is an adaptive delta modulation system which substantially eliminates the signal degradation resulting from the above-noted limitations. In an illustrative embodiment of the invention, the difference between the analog signal and the output of an integrator is applied to a trigger circuit which produces a pulse or no-pulse output signal indicative of the polarity of the difference. This pulse signal is then clocked into a shift register. The output pulse signal of the shift register is transmitted as well as utilized for the generation of the feedback signal. Propagation delay is minimized in the generation of the feedback signal by using different criteria to determine the polarity and the size of the step signal input to the integrator. The polarity of the step signal is determined by gating the signal indicative of the last transmitted signal to a step generator. The size of the step input to the step generator, however, is determined by gating an encoded pulse sequence, stored in the shift register, into an adaptive control circuit. The magnitude of the output signal from the adaptive control is dependent upon the number of consecutive identical pulse signals in the stored encoded sequence. The magnitude of the input signal to the integrator is determined by the combination of the output signal from the adaptive control and a residual charge stored in a finite memory (i.e., another integrator). The finite memory is connected between the adaptive control and the input to the step generator. By preventing rapid decay of the step size, the finite memory enables the delta modulator to encode accurately transitions which have a wide variety of slopes and are in close proximity to each other. That is, the overall response of the present delta modulator to the analog input signal is a fast attack and a slow decay time. This operation provides the most desirable characteristic for the accurate encoding of analog signals.

In accordance with the invention, a novel gating sequence is utilized in the instant encoding process. The gating sequence is divided into three sampling periods or intervals. During the first interval, the output of the trigger circuit or comparator is shifted into the shift register. As in the prior art, this sample is used to determine the polarity of the signal for the next integration, and it is used in the generation of a transmission signal. In the second interval, the appropriate polarity of the step input is applied to the integrator. The size of the next step in the feedback signal is then determined in the third interval. During the course of the encoding operation, the timing sequence effectively determines the size of each step signal before each signal sampling interval and the polarity of each step signal after each signal sampling interval. This encoding procedure uses different criteria to determine the size than it does the polarity of the step. And the encoding decisions for the size and polarity are displaced in time such that the effect of the propagation delay upon the output of the integrator is minimized so as to enable the encoding operation to reproduce accurately signals containing predominant high frequency components.

An advantageous addition to the foregoing illustrative embodiment comprises a slewing clip circuit situated in series between the analog signal source and the encoder. This clip removes only the extreme steep slopes, or rapid rises, from the analog signal and it replaces them with the maximum slope that the encoder is capable of tracking more closely. The steep slopes, if applied directly to the encoder, might otherwise produce the phenomenon known as "edge busyness." The advantage of the slewing clip is that it utilizes neither sampling nor quantizing to introduce a controlled "slope overload" and does so without "edge busyness." The slope overload introduced by the slewing clip is therefore far less objectionable than that otherwise produced by the encoding process. Since most all of the analog signal is not affected by the slewing clip, there is no discernible reduction in the quality of the encoded signal. Thus, the slewing clip is highly beneficial to the encoding operation inasmuch as it only removes that portion of the analog signal which can produce "edge busyness" without any overall degradation in the encoded signal.

It is a particularly advantageous feature of the present invention that the polarity and the size of the step signal are based upon different criteria thus enabling them to be displaced in time to minimize the propagation delay in generating the feedback signal necessary for encoding.

The above and other features of the invention will become more readily apparent from a reading of the following detailed description in conjunction with the accompanying drawings.

BRIEF DESCRIPTION OF THE DRAWINGS

FIGS. 2A and 2B respectively depict the relationship of the step size to the pulse signal sequence and the timing sequence for the feedback signal;

FIG. 5 is a schematic circuit diagram of the step generator of the encoder of FIG. 1;

DETAILED DESCRIPTION

Figure 1:
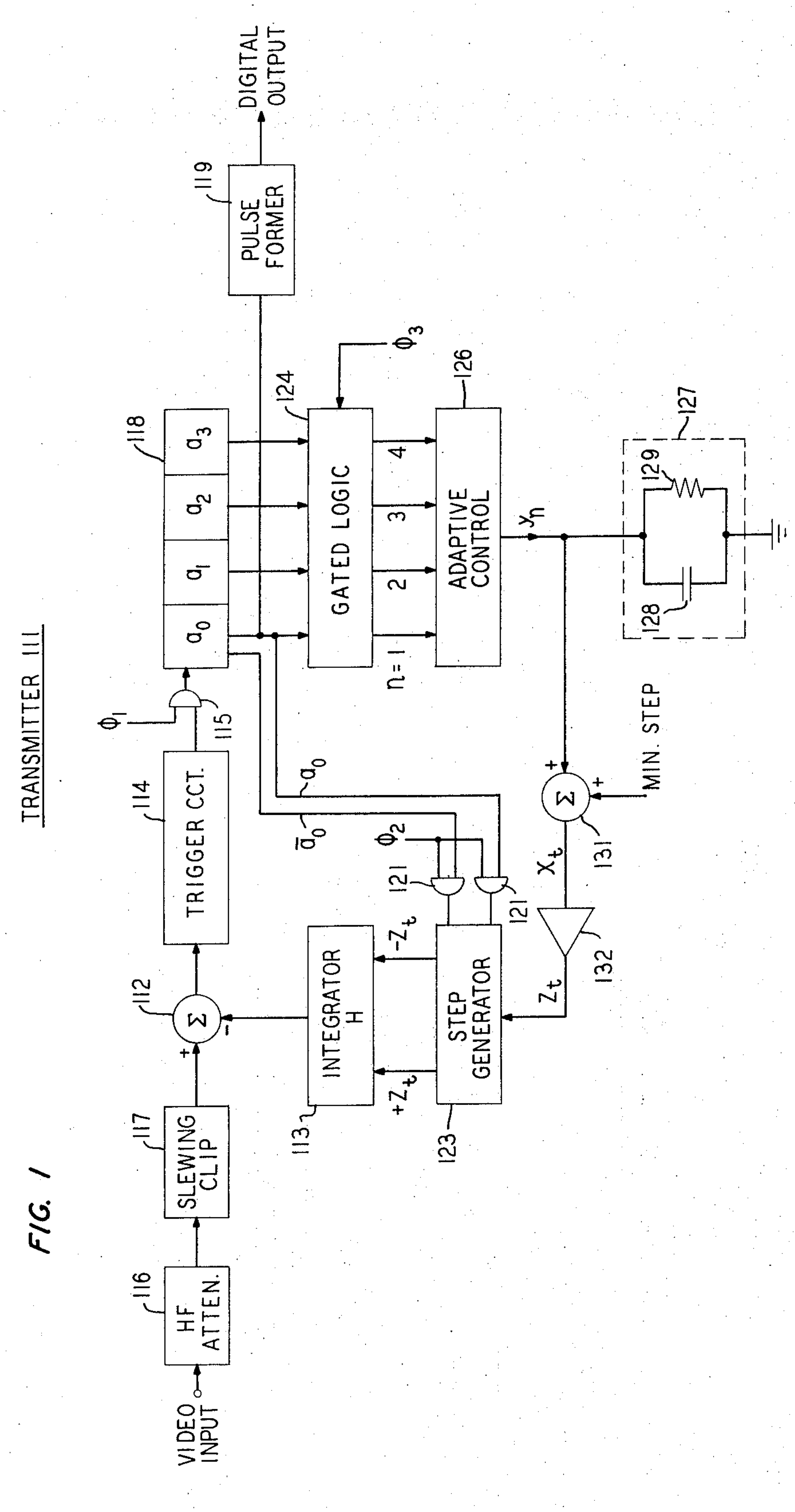
FIG. 1 is a block diagram of an adaptive delta modulation encoder embodying the principles of the present invention.

The transmitter 111 of FIG. 1 is a block diagram of the adaptive delta modulator of the invention. An analog signal, from a suitable source (not shown) is delivered to the subtractor circuit 112. The output of the integrator 113 is subtracted from the analog input signal and the difference is applied to the trigger circuit 114. As shown in FIG. 1, the analog signals are applied to the subtractor 112 via the high frequency attenuator 116 and the slewing clip circuit 117. As will be explained more fully hereinafter, the slewing clip 117 provides a special function for advantageously coding certain types of signals (e.g., video). For other types of signals it may be omitted.

The trigger circuit 114 produces an output which indicates the polarity of the difference signal. Upon the occurrence of clock pulse $\phi_1$ (from a clock pulse source, not shown) at AND gate 115, the output signal of the trigger circuit 114 is stored in the first stage of the shift register 118. The output of the first stage of shift register 118 is applied to the pulse former 119 and to AND gates 121. The pulse former 119 produces an output signal (pulse or space) for transmission purposes. Clock pulse $\phi_2$ causes the AND gates 121 to apply the output of the first stage of shift register 118 to the step generator 123. As shown in FIG. 1, each of the four stages of shift register 118 has an output applied to a gated logic circuit 124. Upon the occurrence of clock pulse $\phi_3$, at gated logic 124, the pulse sequence contained in the four stages of the shift register 118 are delivered to an adaptive control 126. The adaptive control 126 produces an output signal of a magnitude that is a function of the signal pulse sequence stored in the shift register 118. The exact relationship between the signal pulse sequence and the output signal of the adaptive control 126 will be explained more fully hereinafter in the discussion of FIG. 2A. The output from the adaptive control 126 is applied to the finite memory 127 which comprises a capacitor 128 shunted by resistor 129. This shunt arrangement produces a gradually decaying charge function. The signal stored in the finite memory 127 is applied to adder 131. The finite memory 127 provides a residual charge characteristic that prevents rapid decay of step size and increases the ability of the encoder to follow successive transitions of different slopes that are closely spaced. The adder 131 has another signal, with a magnitude representative of a minimum step size, applied to it from a suitable voltage source (not shown). The amplifier 132 provides a scaling factor for the adder output signal, which is applied to the step generator 123.

As will be explained more fully hereinafter, the signals supplied to the step generator 123 by AND gates 121 determine the polarity of the output step of the step generator. The other input signal to the step generator 123 is obtained from the signal path comprised of the gated logic 124, the adaptive control 126, finite memory 127, adder 131 and amplifier 132. The signal from this path determines the magnitude of the output signals from the step generator 123. The combined signals to the step generator serve to produce in the integrator 113 an analog signal which is a replica of the analog input signal. This replica signal is then applied to the subtractor 112.

As indicated in the table of FIG. 2A, the adaptive control 126 produces its greatest output signal ($y_4$) when the signal pulse sequence of the shift register 118 is a repetition of four identical signals. The minimum output ($y_1$) from the adaptive control 126 is produced when the latest signal, $a_0$, added to the signal pulse sequence in the shift register 118 is different than $a_1$, the signal stored immediately preceding it. Intermediate values of signal magnitude ($y_n$) are produced when the sequence of identical signals is of two or three signal pulse lengths.

In FIG. 2B, the timing sequence of clock pulses $\phi_1$, $\phi_2$, and $\phi_3$ is shown. The output of the comparator circuitry (112 and 114) is applied to the shift register 118 via AND gate 115, upon the occurrence of clock pulse $\phi_1$. As depicted by FIG. 2B, the last timing event which occurred just prior to clock pulse $\phi_1$ is the occurrence of clock pulse $\phi_3$. Clock pulse $\phi_3$ causes gated logic 124 to apply the signal pulse sequence in the register to the adaptive control 126. The adaptive control 126, in response to this signal sequence, produces an output signal that is stored in the finite memory 127. This stored signal is applied to the step generator 123 via the adder 131 and the amplifier 132. The size of the output signal of the amplifier 132 determines the magnitude of the step size input to the integrator 113. Since the output signal of the amplifier 132 is produced after a sampling interval, for use at the next sampling interval, any propagation delay introduced by the feedback apparatus in the signal path does not reduce the accuracy of the encoding process. This latter signal however is not applied to the integrator 113 until the occurrence of clock pulse $\phi_2$. The input to AND gates 121 provides a signal that determines the polarity of the step applied to the integrator 113, but the output of the integrator 113 is not used in the encoding process until the occurrence of the next clock pulse $\phi_1$. Sufficient time elapses therefore between pulses $\phi_2$ and the subsequent $\phi_1$ for the integrator 113 to dampen any switching transients. These switching transients normally might cause the trigger circuit 114 to produce erroneous signals. Erroneous signals from the trigger circuit 114 will produce large encoding discrepancies and distort the reproduction that is formed from the encoded signal. The interval between pulses $\phi_3$ and the subsequent $\phi_2$ substantially eliminates the effect of propagation delay, in the generation of the magnitude signal, upon the input signal to the integrator 113. In the process of encoding high frequency signals, such as video signals, it has been found to be particularly advantageous to use a timing sequence in the generation of feedback signals which prevents any propagation delay from influencing the signal encoding.

Figure 3:
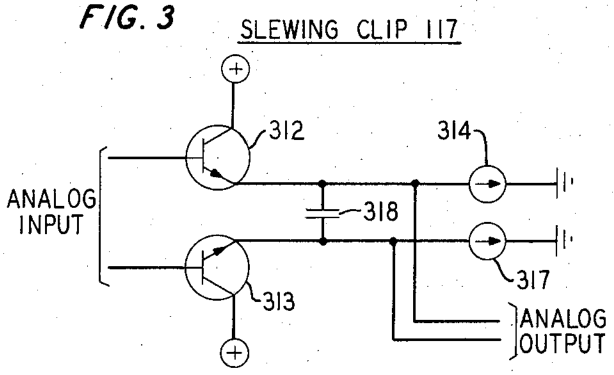
FIG. 3 is a diagram of the slewing clip circuit.

FIG. 3 is a schematic diagram of the slewing clip circuit 117. The slewing clip 117 comprises *n-p-n* transistors 312 and 313, to which is applied a balanced analog input signal. The emitters of transistors 312 and 313 are connected to ground by respective current sources 314 and 317 so as to function as emitter-follower amplifiers. The collectors of transistors 312 and 313 are biased by a positive voltage source. A capacitor 317 is connected between the emitters of transistors 312 and 313. The combination of the capacitor 318 and current sources 314 and 317 reduces the slewing rate or the rate of change in the output signal of the slewing clip 117. The slewing rate determines the maximun slope of the output signal in the analog input signal from the slewing clip 117 only when the analog input contains steep transitions. These steep transitions, if applied directly to a delta modulator, would produce "edge busyness." The unique advantage of the slewing clip 117 is that it only alters the steep transitions in the analog input signal to an extent that eliminates "edge busyness" without any degradation in the overall quality of the reproduced analog signal.

Figure 4A:
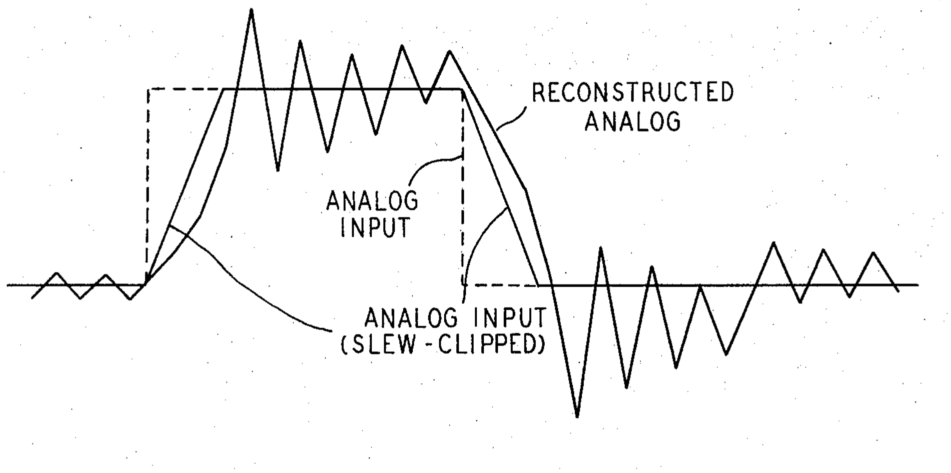
FIGS. 4A, 4B, 4C, and 4D are a series of waveforms that illustrate the encoder performance for a particular analog input.
Figure 4B:
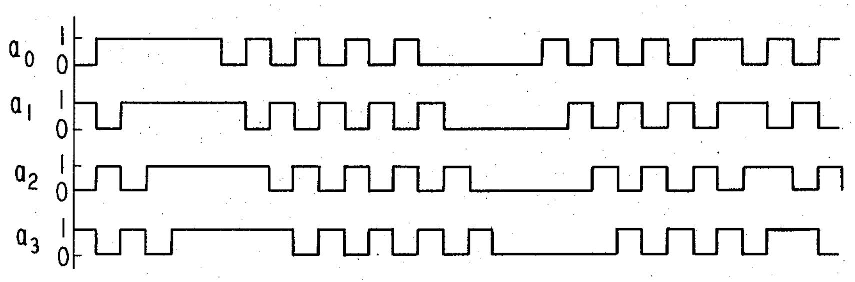
Figure 4C:
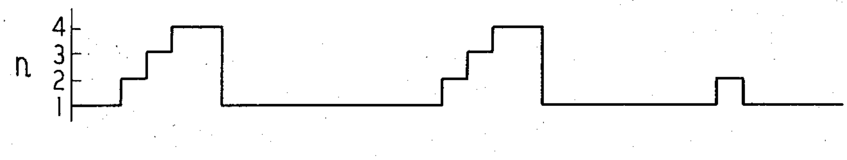
Figure 4D:
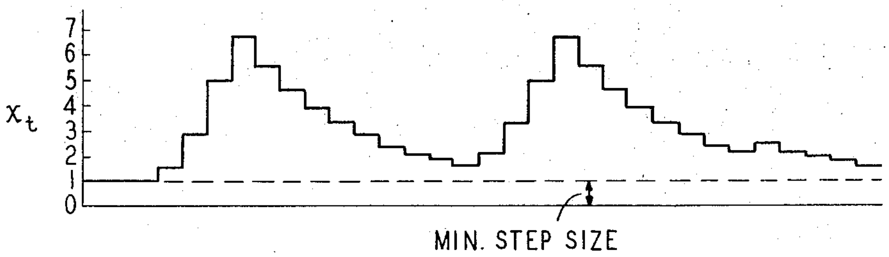

In operation, the analog input signal represented in FIG. 4A (by the dashed lines) contains two steep transitions (i.e., the leading and trailing edges). It is to be understood that severe transitions in the input signal were selected to illustrate encoding performance. Also, since all delta modulators produce an output that is delayed by one sampling interval, this fixed delay, which does not produce any degradation in the reproduced signal, is not shown in FIG. 4A. The slewing clip 117 changes the vertical transitions into sloped transitions (shown by the solid line labeled "analog input"). Prior to these sloped transitions, the transmitter 111 is operating in the quiescent state, alternating back and forth in steps of minimum size. Thus, the transmitter 111 produces a train of alternating signals, or pulses and spaces. The leading sloped transition causes the trigger circuit 114 in the transmitter 111 to produce a continuous pulse output until the difference between the input signal and the feedback signal reverses polarity. This can be seen in the first waveform of FIG. 4B, labeled $a_0$. The first waveform of FIG. 4B represents the sequence of pulses stored in the first stage of the shift register 118. Sequences of pulses stored in the succeeding stages in the shift register 118 correspond to the pulse sequences $a_1$, $a_2$, and $a_3$ of FIG. 4B. As can be seen in FIG. 4B, each of the pulse sequences $a_1$, $a_2$, and $a_3$ is shifted to the right one time slot from the pulse sequence above it. FIG. 4C shows graphically the values of n depicted by the table in FIG. 2A. The values of n are in accordance with the table shown in FIG. 2A which was discussed previously. In essence this is the input signal to the adaptive control 126. In FIG. 4D is shown the output signal, $x_t$, applied to the amplifier 132. The signal $x_t$ is computed by the formula:

$$x_t = 1 + \quad (x_{t-1} - 1) + y_n. \tag{1}$$

In this formula, the new input signal, $y_n$, for the finite memory 127 is computed from the value of $n$. Typically assigned values for the signal $y_n$ are shown in the extreme right-hand column of FIG. 2A. It is to be understood that these values are only illustrative and one skilled in the art may alter these values to obtain optimum results based upon the statistical nature of the analog signal to be encoded. The term $\alpha(x_{t-1} - 1)$ represents the residue of the previous values of $y_n$ in which $\alpha$ is the decay factor of the finite memory 127 and $(x_{t-1} - 1)$ is the difference between the weighted previous $x_t$ and the minimum step size. The weighting introduced by the finite memory 127 provides continuous companding of the step size. The integer 1 represents the minimum step size injected into the signal $x_t$ by the adder 131. This is done to insure stable operation of the transmitter 111. The waveform $x_t$ of FIG. 4D illustrates the effective range of the step size variations produced from the analog input signal. The reconstructed analog signal from the integrator 113 is produced using the signal $x_t$. This reconstructed analog signal is shown superimposed upon the analog input signal in FIG. 4A to illustrate graphically the performance of the transmitter 111 to an analog input signal containing steep transitions.

FIG. 5 is a schematic circuit diagram showing primarily the step generator 123, as well as the AND gates 121, memory 127 and adder 131. The input signal $y_n$ is applied through a transistor 512, connected as a diode, to the finite memory 127. The minimum step size voltage is applied to the terminal 513 of the adder 131. In this case, the adder 131 comprises simply a resistor 514 connected to the input path of the step generator. The combination of the signal $y_n$ and the minimum step size voltage are applied to the base of a transistor 516. The emitter of transistor 516 is serially connected by a resistor 517 to a negative voltage source. The transistor 516 draws a current from either a transistor 518 or one transistor in the pair comprising transistors 521 and 522. When the pair of transistors 521 and 522 are not under the influence of clock pulse $\phi_2$, a bias applied to the base of transistor 518 causes transistor 518 to supply the collector current for the transistor 516. The level of this bias is one-half of the difference between the switching levels applied by AND gates 121 to the transistors 521 and 522. Clock pulse $\phi_2$ and the output of the first stage of the shift register 118 causes AND gates 121 to turn on either transistor 521 or 522. If $\bar{a}_0$ is positive, the transistor 521 produces a step output (designated "$+z_7$") of a magnitude determined by the signal at the base of the transistor 516. If $\bar{a}_0$ is positive, the transistor 522 produces a step output (designated "$-z_t$") whose magnitude is also determined by the signal on the base of the transistor 516. The $+z_t$ signal will serve to charge a capacitor, for example, in integrator 113, while a $-z_t$ signal will discharge the same. In either case, the step generator output signal is applied to the integrator 113 of FIG. 1 only during the occurrence of the clock pulse $\phi_2$. The diode connection of transistor 512 compensates for the temperature dependence of the base-emitter voltage drop of the transistor 516 and maintains a step size signal independent of ambient temperature changes. Devices 512 and 516, for example, may be monolithic to make the temperature compensation independent of manufacturing tolerances.

Figure 6A:
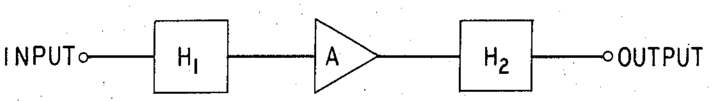
FIGS. 6A and 6B respectively depict the arrangement and performance characteristic of the broadband integrator of the encoder of FIG. 1.
Figure 6B:
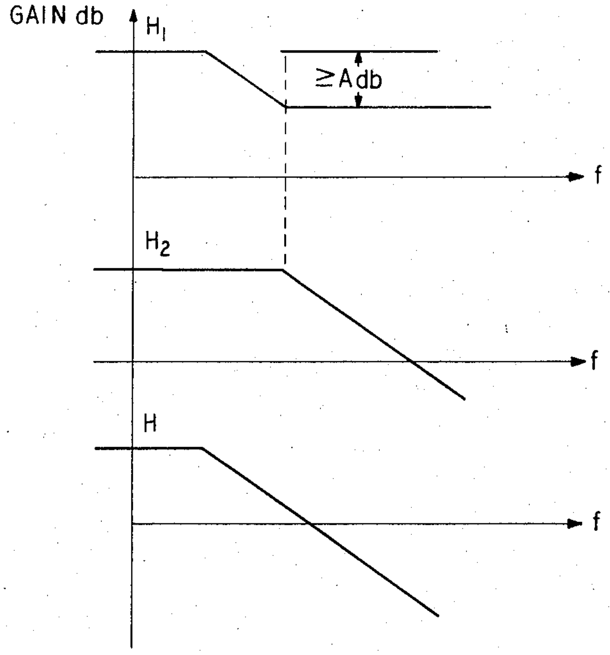

FIG. 6A illustrates a practical and advantageous embodiment of the integrator 113. The integrator arrangement, shown in FIG. 6A, provides output signals of a reasonable signal level without the requirement of a large input signal. The two integrator networks $H_1$ and $H_2$ each provide partial integration which together achieve the desired integration depicted by the characteristic curve labeled H in FIG. 6B (i.e., $H_1$ $H_2$ =H). The amplifier labeled A provides a flat gain of "A"*dB.* which is sufficient to compensate for the high frequency attenuation of integrator $H_1$. This arrangement provides sufficient output signal levels from a reasonable level input signal without producing any unduly large levels in the integration process.

Figure 7:
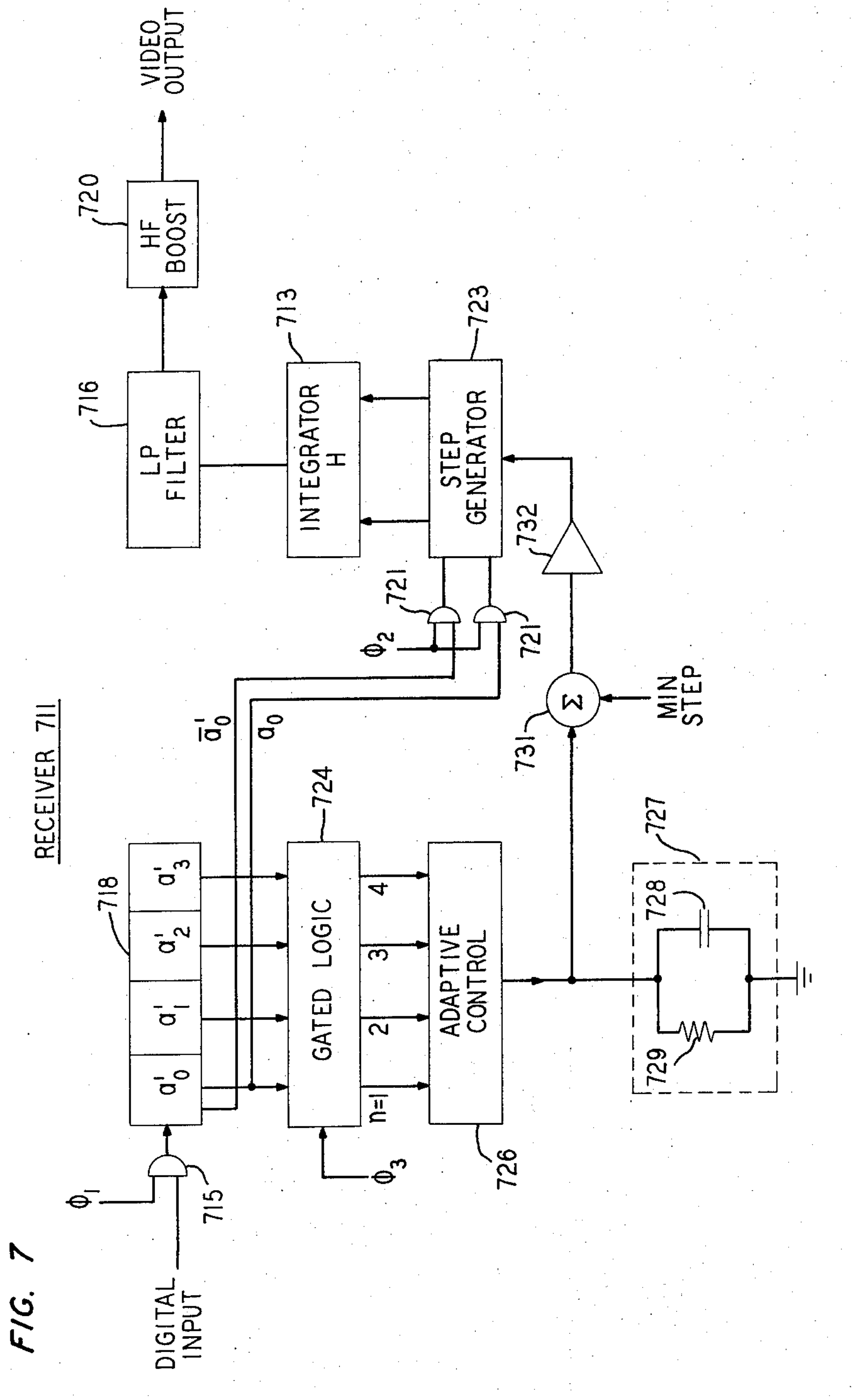
FIG. 7 is a block diagram of a decoder in accordance with the principles of the invention.

As is typical in delta modulation systems, the decoder at the receiver contains virtually identical circuitry to that used in the feedback portion of the encoder. In FIG. 7, there is shown receiver 711 for decoding the encoded signals transmitted by the transmitter 111 of FIG. 1. The delta modulated pulse train of the received signal is applied to gate 715 under the control of clock pulse $\phi_1$ from a source (not shown). Each component in FIG. 7 is assigned a reference numeral with the same two digits as the reference numeral of the component in FIG. 1 which performs the same or an analogous function. Thus, the shift register 718 stores the signal pulse sequence for four consecutive signals of the delta modulated pulse train. From the shift register 718, the output of the first stage is applied via AND gates 721 to a step generator 723, while the output of each stage of the register is applied via gated logic 724 to an adaptive control 726. Gating circuits 721 and 724 are under the respective control of clock pulses $\phi_2$ and $\phi_3$. The timing sequence of clock pulses $\phi_1$, $\phi_2$ and $\phi_3$, as depicted by FIG. 2B, is the same for both the transmitter 111 of FIG. 1 and the receiver 711 of FIG. 7. The components 727, 731, 732, 723, and 713 reconstruct an analog replica of the encoded signal. The finite memory 727 also provides a dissipating effect of transmission errors to prevent their accumulation. The filter 716 removes any high frequency noise, above the signal bandwidth, from the analog signal before application to a high frequency booster 720. The high frequency booster 720 stores the high frequency components of the analog signal which were supressed by the high frequency attenuator 116 of FIG. 1.

Various components of the encoder and decoder, such as trigger circuit 114, shift register 118, gating circuits 121 and 124, and pulse former 119, comprise circuits which are well known in the art. The adaptive control 126 can be easily constructed by those in the art once the values of the step size signal $y_n$, as represented by FIG. 2A, are selected. For purposes of explanation, a series sequence of four pulse signals was utilized to determined the magnitude of the step size; however, it will be clear that this sequence may comprise other and different numbers of pulse signals in the sequence (e.g., five, six, etc.).

It is to be understood therefore that the delta modulation system disclosed in the foregoing is intended to merely represent an illustrative embodiment of the principles of the invention. Various changes and modifications of the system herein disclosed may occur to those in the art without departing from the spirit and scope of the invention.

I claim:

1. In an adaptive delta modulation system, an encoder for encoding an analog signal as a digital signal to be transmitted, said encoder comprising:

slewing clip means for altering the extreme steep slopes of an input analog signal by replacing the same with a predetermined maximum slope that the encoder is capable of tracking;

comparator means for receiving the altered input analog signal;

first gating means connected to said comparator means for sampling the output of said comparator means to produce a digital signal;

storage means for continuously maintaining a signal pulse sequence of a plurality of sequential digital signals from said first gating means;

means for periodically transmitting a signal indicative of the most recent signal in the signal pulse sequence contained in said storage means;

second gating means connected to said storage means for providing a group of output signals indicative of the signal pulse sequence stored in said storage means;

adaptive control means responsive to said group of output signals from said second gating means for producing an output signal having a magnitude that is a preselected function of the sequence of successive identical signals in said signal pulse sequence;

finite memory means connected to receive the output signal from said adaptive control means and to temporarily store same;

third gating means connected to said storage means for supplying a signal indicative of the most recent signal in said signal pulse sequence;

generator means connected to receive the output of said third gating means and the signal stored by said finite memory means, said generator means producing a step signal having a polarity determined by the output of said third gating means and of a magnitude determined by the signal stored by said finite memory means, said second gating means providing said group of output signals for said adaptive control means before said first gating means is enabled while said third gating means is enabled after said first gating means so that the magnitude of each step signal is based upon the signal pulse sequence before said first gating means adds the most recent signal thereto while the polarity of that step is determined by the output of said third gating means indicative of the most recent signal added to the signal pulse sequence by said first gating means; and an integrator for receiving the step signal output of said generator means and for supplying a proportionate output signal to said comparator means, said comparator means providing an output signal to said first gating means based upon the difference between the altered input analog signal and the output of said integrator.

* * * * *